May 15, 1934.   A. E. CARTER   1,959,229
COASTER WAGON
Original Filed June 9, 1933    2 Sheets-Sheet 1
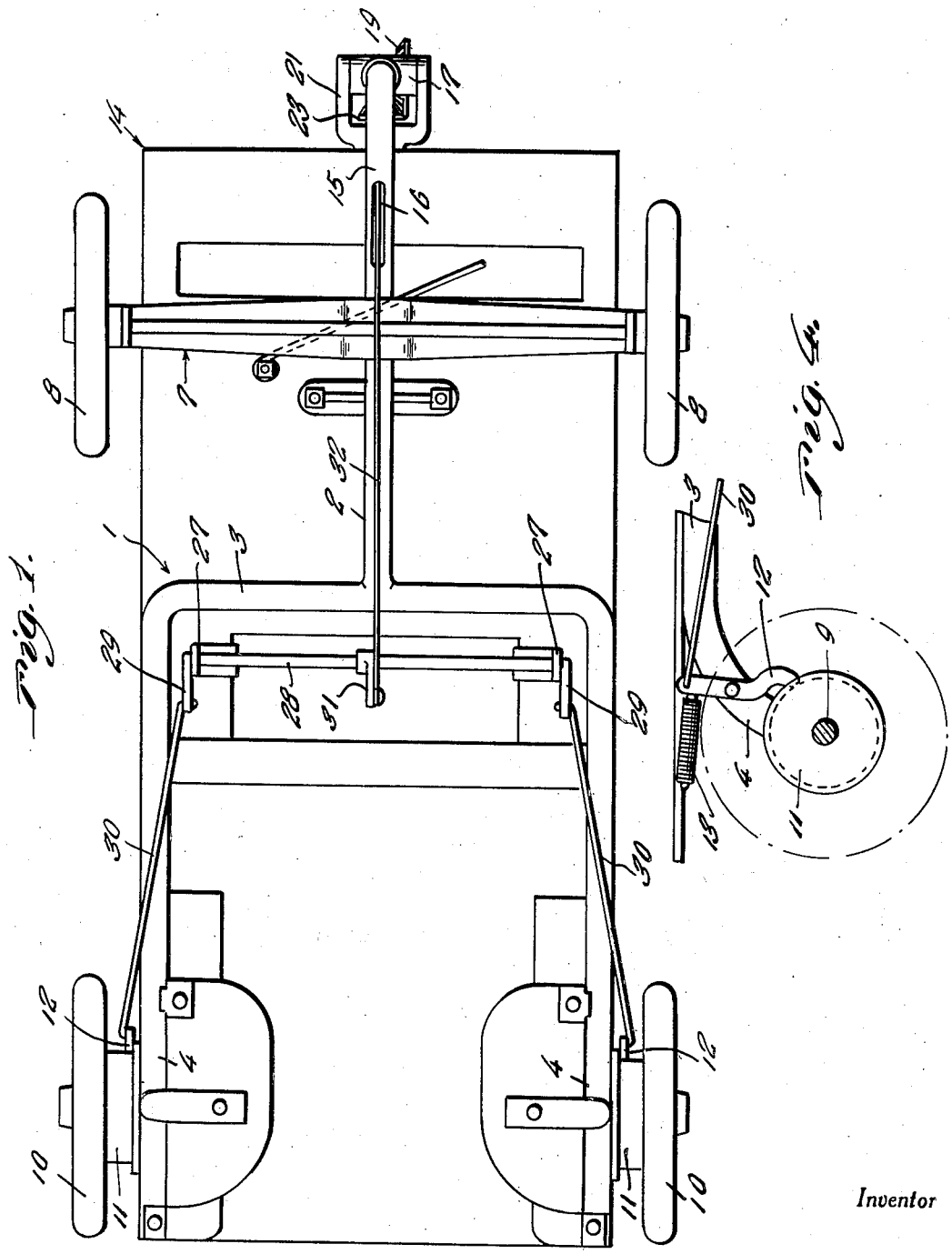
Inventor
Amos E. Carter
By Clarence A. O'Brien
Attorney May 15, 1934.  A. E. CARTER  1,959,229
COASTER WAGON
Original Filed June 9, 1933  2 Sheets-Sheet 2
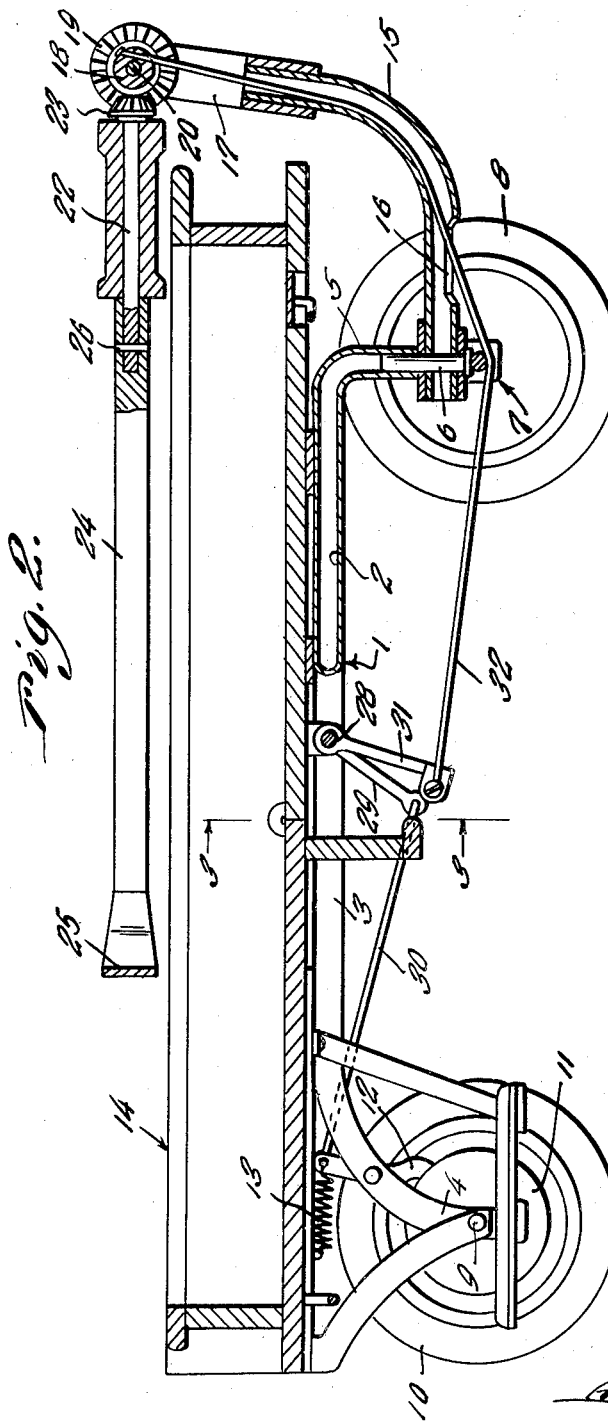
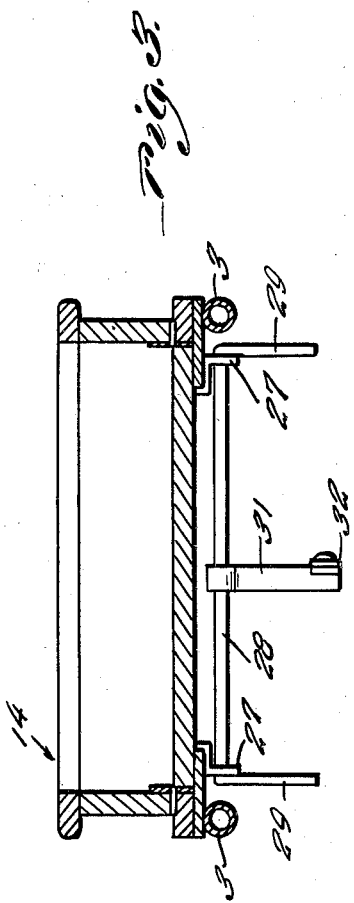
Inventor
*Amos E. Carter*
By *Clarence A. O'Brien*
Attorney Patented May 15, 1934

1,959,229

UNITED STATES PATENT OFFICE 1,959,229

COASTER WAGON

Amos E. Carter, Omaha, Nebr.

Original application June 9, 1933, Serial No. 675,122. Divided and this application November 4, 1933, Serial No. 696,703

3 Claims. (Cl. 280—88)

This invention pertains to new and useful improvements in coaster wagons, particularly for children and is a division of my co-pending application Serial No. 675,122, filed June 9, 1933.

The primary object of the present invention is to provide, in a manner as hereinafter set forth, a vehicle of the aforementioned character embodying novel brake operating and steering means.

Other objects of the invention are to provide a brake operating and steering means for coaster wagons which will be comparatively simple in construction, strong, durable, highly efficient and reliable in operation and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in bottom plan of the invention.

Figure 2 is a vertical longitudinal sectional view.

Figure 3 is a view in vertical transverse section, taken substantially on the line 3—3 of Figure 2.

Figure 4 is a vertical sectional view through one of the rear axles showing, in side elevation, one of the brakes.

Referring now to the drawings in detail, it will be seen that the embodiment of the present invention which has been illustrated comprises a substantially Y-shaped tubular frame which is designated generally by the reference numeral 1, said frame including a stem 2 and angular arms 3. The rear portions of the arms 3 are curved downwardly, as at 4. The stem 2 terminates in a downturned forward end portion 5 which rotatably receives the king pin 6 of a horizontally swinging front axle unit which is designated generally by the reference numeral 7. The front wheels 8 of the vehicle are, of course, journaled on the axle 7. Stub axles 9 project from the lower portions of the downwardly curved portions 4 of the arms 3 and have journaled thereon rear wheels 10. Fixed on the inner sides of the rear wheels 10 are peripherally grooved or channeled brake drums 11. Brakes 12 are pivotally mounted, at an intermediate point, on the downwardly curved portions 4 of the arms 3 for operative engagement with the drums 11, said brakes 12 being yieldingly urged at all times toward inoperative position by coil springs 13. Mounted on the frame 1 is a body which is designated generally by the reference numeral 14.

Fixed centrally on the front axle 7 is a substantially tubular horn 15 through the rear end portion of which the king pin 6 passes, said horn terminating in an upturned forward end portion. The horn 15 has formed in the lower side of its rear portion an opening 16. Fixed on the upper end portion of the horn 15 is a yoke 17 in which a shaft 18 is mounted. Journaled on the shaft 18 is a drum 19 having an integral beveled gear 20 on one end. The end portions of the shaft 18 project beyond the yoke 17, and a yoke 21 straddles said yoke 17, the yoke 21 having a shaft 22 journaled longitudinally in its shank or stem portion. A comparatively small beveled gear 23 is fixed on one end portion of the shaft 22 in mesh with the gear 19. Fixed on the other end portion of the shaft 22 is a tongue 24 having a handle 25 on its free end. The shaft 22 is engaged in a socket which is provided therefor in the tongue 24 and is secured therein by suitable means, such as a pin 26. It will thus be seen that the tongue 24 is mounted in a manner to permit free swinging movement in a vertical plane, but to impart swinging movement in a horizontal plane to the front axle 7 when said tongue 24 is swung laterally.

Journaled in suitable bearings 27 beneath an intermediate portion of the body 14 is a rocker shaft 28 which terminates in downturned arms 29. Rods 30 operatively connect the arms 29 to the brakes 12. Fixed on an intermediate portion of the rocker shaft 28 is an arm 31 to which one end of a suitable cable 32 is connected.

The cable 32 passes through the horn 15 and has its other end connected to the drum 20 for winding thereon. The cable 32 enters the horn 15 through the opening 16 in said horn, as illustrated to advantage in Figure 2 of the drawings.

As will be apparent, the wagon is steered by swinging the tongue 24 laterally, thereby swinging the front axle 7 in a horizontal plane, as hereinbefore set forth. To apply the brakes 12, the tongue 24 is rotated to actuate the drum 20 in a manner to wind the cable 32 thereon, thus actuating the rocker shaft 28 in a direction to swing said brakes 12, through the medium of the rods 30 into engagement with the drums 11 against the tension of the coil springs 13. Of course, to release the brakes 12, the tongue 24 is rotated in the opposite direction to unwind the cable 32 from the drum 20 and permit the springs 14 to function.

It is believed that the many advantages of a coaster wagon in accordance with this invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A wagon body comprising a frame, a body mounted on the frame, an axle pivotally mounted on the frame, front wheels journaled on the axle, rear wheels mounted on the frame, brakes, operatively engageable with the rear wheels, a tubular horn mounted on the axle, a drum rotatably mounted on the horn, a tongue rotatably and pivotally supported on the horn, means operatively connecting the drum to the tongue for actuation thereby, and a cable extending slidably through the horn and windable on the drum and operatively connected to the brakes.

2. A coaster wagon comprising a tubular frame including a downturned forward end portion, a front axle rotatably engaged beneath said downturned forward end portion, a tubular horn mounted on the axle, a king pin journaled in the downturned end portion of the frame for swingingly connecting the axle thereto, said king pin traversing the horn, rear wheels mounted on the frame, brakes operatively engageable with the rear wheels, a drum mounted on the horn, a tongue pivotally and rotatably mounted on the horn, means operatively connecting the drum to the tongue for actuation thereby, and a cable windable on the drum and operatively connected to the brakes for applying said brakes when the drum is rotated in either direction, said cable passing substantially through the horn.

3. A coaster wagon comprising a frame, rear wheels journaled on the frame, brakes operatively engageable with said rear wheels, a front axle mounted for swinging movement on the frame, front wheels journaled on said axle, a tubular horn fixed on the axle, a yoke fixed on the horn, a drum journaled in the yoke, another yoke pivotally mounted for swinging movement on the first named yoke, a shaft journaled longitudinally in the shank portion of the second named yoke, means operatively connecting the drum to the shaft for actuation thereby, a tongue fixed on the shaft, and a cable windable on the drum and connected to the brakes, said cable extending substantially through the horn.

AMOS E. CARTER.